March 6, 1962 J. C. WHITE 3,023,989
CLAMP AND CLAMP ASSEMBLY
Filed Oct. 21, 1958 4 Sheets-Sheet 1
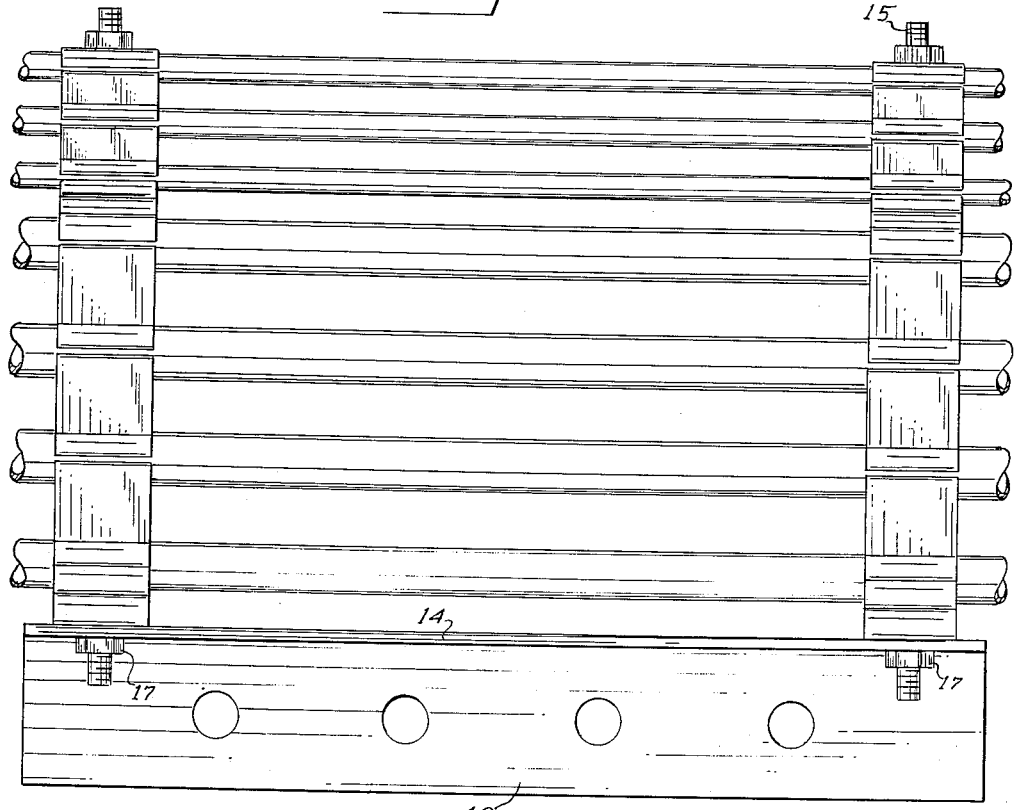
Fig. 1
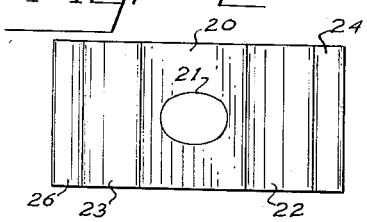
Fig. 2
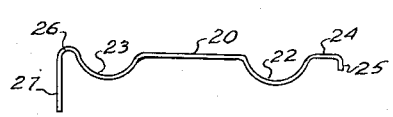
Fig. 3
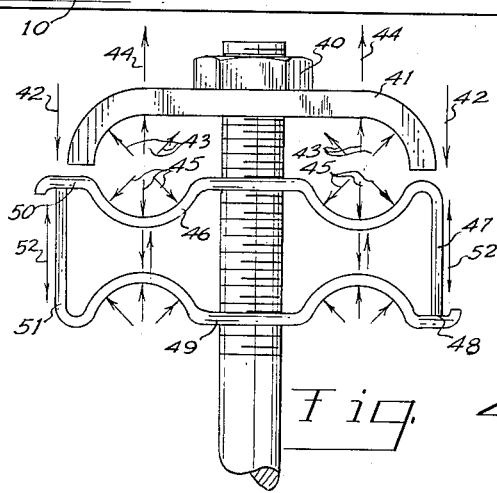
Fig. 4
INVENTOR.
JAMES C. WHITE
BY
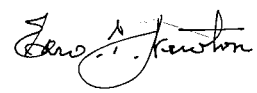
ATTORNEY March 6, 1962 J. C. WHITE 3,023,989
CLAMP AND CLAMP ASSEMBLY
Filed Oct. 21, 1958 4 Sheets-Sheet 2
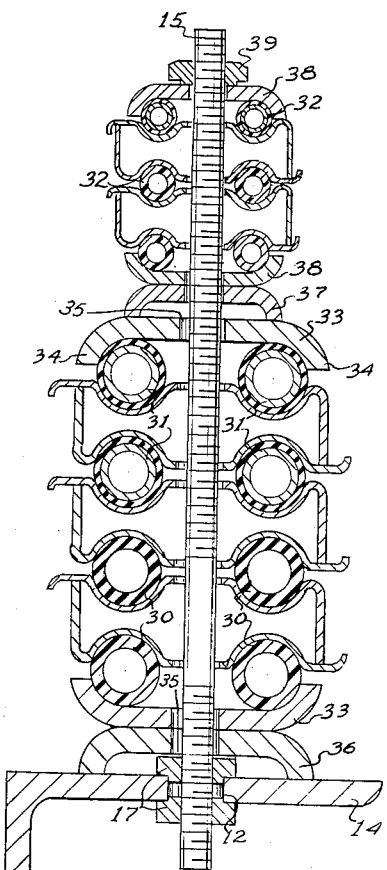
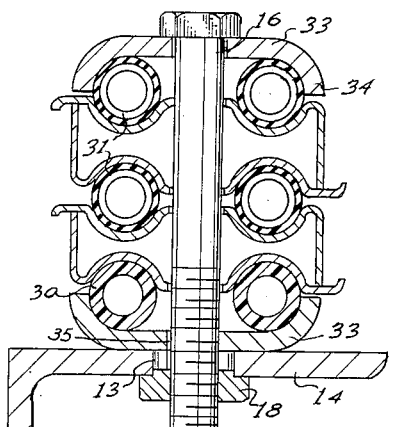
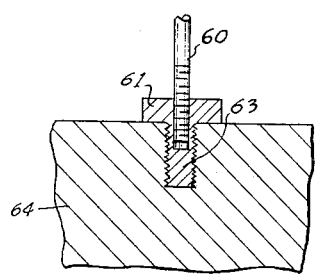
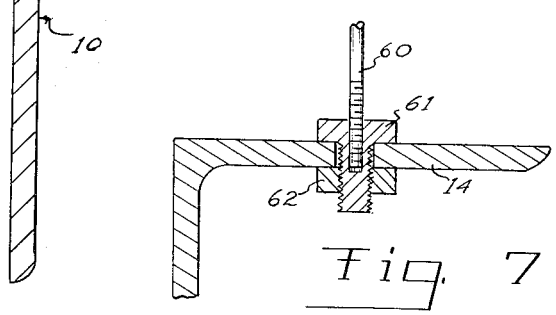
INVENTOR.
JAMES C. WHITE
BY
ATTORNEY March 6, 1962  J. C. WHITE  3,023,989
CLAMP AND CLAMP ASSEMBLY
Filed Oct. 21, 1958  4 Sheets-Sheet 3

INVENTOR:
JAMES C. WHITE
BY
ATTORNEY

March 6, 1962  J. C. WHITE  3,023,989
CLAMP AND CLAMP ASSEMBLY
Filed Oct. 21, 1958  4 Sheets-Sheet 4

INVENTOR:
JAMES C. WHITE
BY
ATTORNEY

# United States Patent Office 3,023,989
Patented Mar. 6, 1962

3,023,989
CLAMP AND CLAMP ASSEMBLY
James C. White, P.O. Box 571, Greer, S.C.
Filed Oct. 21, 1958, Ser. No. 768,660
13 Claims. (Cl. 248—68)

This invention relates to a clamp and clamp assembly, and is particularly concerned with means for securing tubes, pipes, wires, cables and the like in sized, spaced, parallel relation.

Conventional securing and supporting clamps for elongate circular bodies such as tubes, pipes, wires, cables and the like are usually characterized by the provision of opposed clamping elements secured together by tension means in the nature of nut and bolt connections disposed at one side of the supported or secured element. Such clamps may be either single or double and in either case the customary practice results in a cantilever action tending to flex the clamp elements with respect to their interengaging bolts or nuts. Obviously such flexing retention of the articles subjects the clamps to deterioration as the flexed clamps take a set. Furthermore, there is constant likelihood of displacement of the retained articles from between the unattached ends of such cantilever acting clamps. Also, such conventional clamps do not lend themselves to rigid, compounded, multiple assemblies to construct a rack by which groups of articles may be rigidly maintained in parallel relation without danger of displacement. It is to be noted that should such spring tension cantilever clamps be assembled in multiple fashion for the support of a plurality of parallel articles, they would not provide a rigid structure by which tension could be applied through a beam type of force application. Hence such devices are not securely retained against transverse displacement by the interengagement of parallel side members by which the forces acting on both sides of the retained articles so stress the clamp as a beam. In such prior clamps the elements are sprung in cantilever fashion as tension is applied on the retained article.

It is therefore among the objects of the present invention to provide a novel, simple and improved clamp and clamp assembly for the support and retention of pipes, wires, cables or the like.

More particularly it is an object of the present invention to provide a clamp and/or a clamp assembly in which the retained and supported device is secured by forces acting in simple beam force transmission manner as distinct from clamping forces acting as a cantilever beam tending to spring the clamp into retaining tension about the article retained or supported.

A further and important object of the present invention is to provide clamp elements which may be conventionally combined and stacked into assemblies for the parallel retention of a plurality of articles.

Another object of the invention is to provide a single clamp element which may be arranged in interengagement with like elements to securely retain therebetween plural articles and which thus lend themselves to economic mass production and to interengaging multiple assemblies of identical units.

The invention further has as an important objective that of providing rigid multiple clamp assemblies for the retention and support of banks of parallel tubes, pipes, wires, cables or the like and in which the structure of such multiple assemblies is free from the spring type of flexible retention common to the clamps of the cantilever beam action type.

These and other objects, features and advantages of the present invention will be apparent from consideration of the following specification taken in conjunction with the accompanying drawings, in which:

FIG. 1 is a side elevation of a rack of tubes, pipes, wires, cables or the like bound by the assembly of clamps of the present invention.

FIG. 2 is a top plan view of one of the individual clamp elements of the present invention.

FIG. 3 is a side elevation of the clamp shown in FIG. 2.

FIG. 4 is a view illustrating the forces acting in the combining of the clamp elements of FIGS. 1 and 2 for the retention or support of articles.

FIG. 5 is a vertical cross-sectional view taken on the line 5—5 of FIG. 1.

FIG. 6 is a similar cross-section showing a modified form of the tube rack assembly.

FIG. 7 illustrates an alternate means of securing the tie rods.

FIG. 8 shows a further modified form of tie rod securement.

While the present invention may be carried out by the use of clamps having a wide variety of size, shape, contour, and configuration, those forms of the invention here shown by way of illustration may be defined as including individual clamp elements preferably formed of relatively rigid sheet metal or the equivalent. Each individual element comprises a body member having a surface defining an aperture therethrough and provided on either side thereof with curuled article receiving depressions. Each element includes a narrow depending lip extending in a direction generally normal to the plane of such surface. In those forms of the invention shown in FIGS. 1 through 11 and 15 through 17, each element further includes a spaced, opposed and parallel depending flange of substantially greater width. As will be clearly noted from the drawings, these individual elements are adapted to be united as relatively inverted pairs, the extending flange of one being reversed to be received within the relatively narrow lip of a superposed or subjacent element of like configuration. In the multiple assembly of these individual clamp elements to constitute a rack or bank for the support and retention of multiple tubes, pipes, wires, cables or the like, a retaining tie rod is passed freely through the central apertures of the clamp elements.

Above and below the assembled banks in FIGS. 1, 4, 5, and 6, there are provided transversely dished terminal plates which are adapted to engage the upper or lower outer faces of the end articles in such assemblies. It is important to note that as the bolt is tightened to draw together the end plates, such plates will apply pressure upon the retained end articles and therethrough to the clamp member engaging the opposed sides thereof. Since the clamp elements are loosely mounted on the tie rods, pressure applied to the tubes by the plates is transmitted equally and oppositely on either side of the clamp therebelow, this clamp then acts as a simple beam delivering parallel forces to the extended flange and the horizontal area. The horizontal area on one side of such clamp will bear against the flange of the next adjacent inverted clamp while the wide flange of the first mentioned clamp will engage and exert equal parallel pressure on the horizontal area of such adjacent clamp element.

Figure 9:
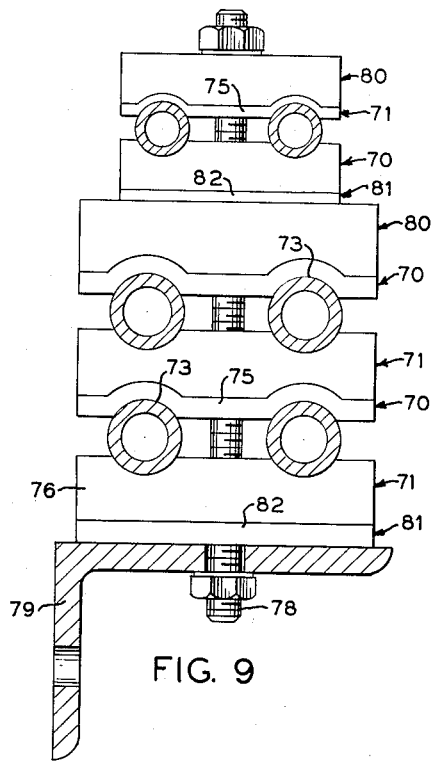
FIG. 9 is a side elevation of a rack formed by a group of clamp elements of an alternative construction from that presented in FIGS. 1 to 6 inclusive.
Figure 10:
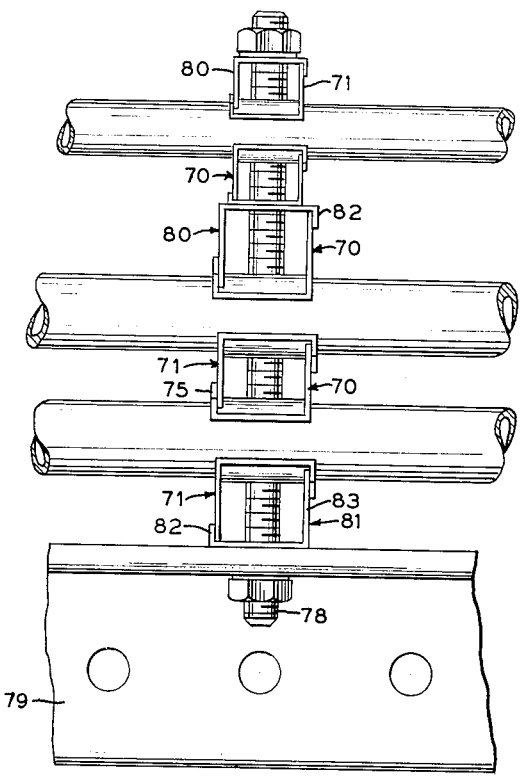
FIG. 10 is an end elevation of the rack shown in FIG. 9.
Figure 11:
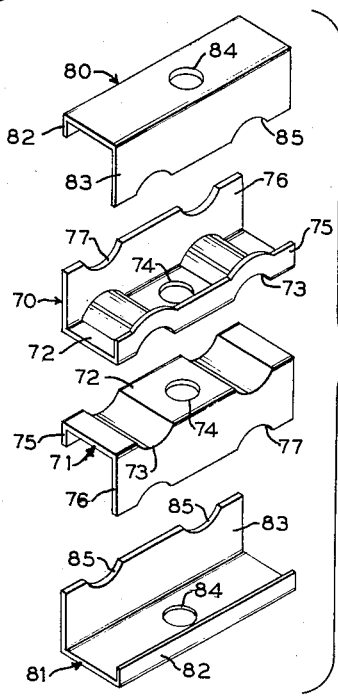
FIG. 11 is an exploded view illustrating in detail a group of the clamp elements of modified design used in the assembly of the rack of FIGS. 9 and 10.
Figure 12:
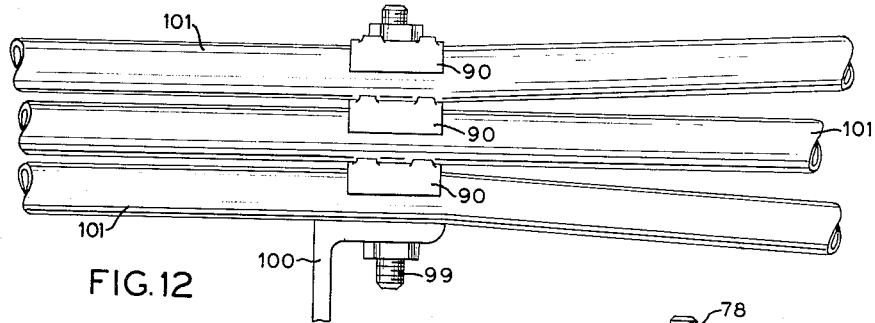
FIG. 12 is a side elevation of tubes, pipes, wires, cables or the like bound by another modified form of clamps of the present invention.
Figure 13:
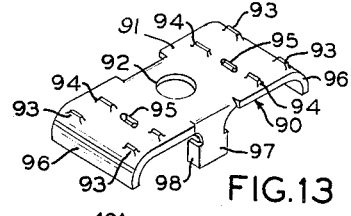
FIG. 13 is a perspective view of an individual clamping element of FIG. 12.
Figure 14:
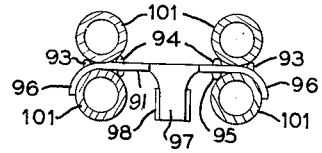
FIG. 14 is an end elevation of the clamping element shown in FIG. 13, supporting the tubes, etc. of FIG. 12.

In that form of the invention shown in FIGS. 1 through 6 of the drawings the elements are shown as formed with the opposed, parallel lips and flanges at the ends of the elements. Thus the lips and flanges lie in spaced planes normal to the general plane of the central body and transverse its longitudinal axis. However the invention is not limited to this location of the lips and flanges. As shown in FIGS. 9, 10 and 11 the lips and flanges may be formed at the longitudinal edges of the central recessed body. By such formation a longitudinal rigidity is provided throughout the length of the combined elements. It will also be noted that in such configuration a transverse displacement between coupled pairs of elements is inhabited by the abutment of flange against lip. While in that form of element shown in FIGS. 2 and 3 a like abutment precludes longitudinal displacement, since transverse creeping of one element with respect to the other may result from movement of the retained pipes, tubes, or cables along their length, that form of the invention shown in FIGS. 9, 10 and 11 may be preferable in some particular installations. In FIGS. 12 through 14 the flanges are formed centrally of the central body and the recesses or curules are formed by protuberances.

Figure 15:
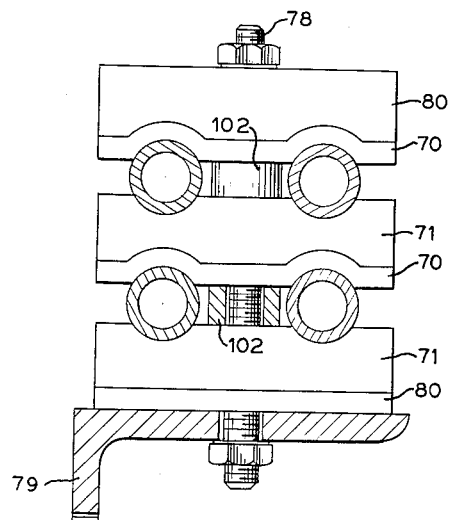
FIG. 15 is an end elevation of the clamping elements FIGS. 9 through 11, showing an optional spacing sleeve between respective elements.
Figure 16:
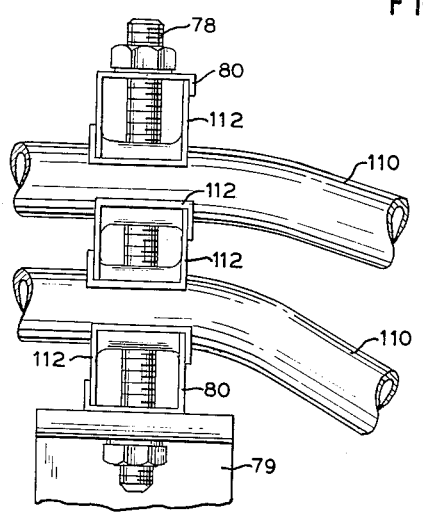
FIG. 16 is a side elevation of the clamping elements of FIGS. 9 through 11 showing its recesses being belled to facilitate tubes, etc., which are bent immediately after passing through the clamping elements.
Figure 17:
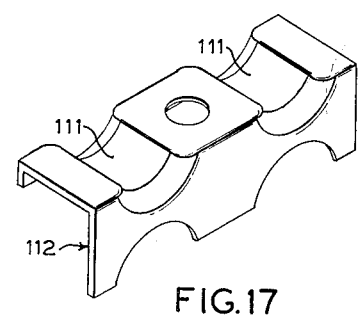
FIG. 17 is a perspective view of one of the clamping elements of FIG. 16.

Of course, in some instances it may be found desirable to space positively the clamping elements apart such as shown in FIG. 15 so that a positive tight feel is imparted to the nut when it is tightened. In cases where the tubes or other conduits retained by the clamping elements need to be bent, the recesses or curules may be belled out as shown in FIGS. 16 and 17.

In an analysis of the forces acting in the assembly of these plural clamps, it will be seen that a nut or stud, while delivering pressure centrally of the terminal plates, does not produces central pressure between the individual clamp elements (except in those forms of the invention shown in FIGS. 12 through 15). This pressure to the contrary is exerted on the interconnected wide flanges so that parallel vertical forces will act on such clamps. Such clamps will act as beams in contradistinction to the more conventional clamps in which the pressure is applied at the center to act in a flexing cantilever mode of applying pressure for support and retention. As will clearly be seen from the drawings and further discussion of the present specification, the individual clamps may be arranged in various multiple arrangements and the clamps may be of varying size to accommodate various cross-sectional dimensions of the articles to be supported or retained. Furthermore, it will be noted that clamps of different sizes may be assembled as a single rack to support elongated cylindrical pieces of various sizes in a single simple and rigid constructon.

Referring now more particularly to the drawings, it will be seen that the assembly of clamps may be conveniently supported on any desired type of structure such as for instance the perforate angle irons 10 of FIGS. 1 and 5, or 11 of FIG. 6, or 79 of FIGS. 9, 10, 15 and 16, or 100 of FIG. 12. As shown at 12 in FIG. 5, and at 13 in FIG. 6, the horizontal flanges 14 of the angle iron supports are preferably apertured with holes of a dimension substantially greater than the diameter of the securing rod 15 of FIGS. 1, 4 and 5 or the stud bolt 16 of FIG. 6. For centering these vertical threaded tie members with respect to the apertures, threaded securing nuts are provided having reduced necks to snugly engage the apertures while their central threaded portion engages the tie rods. Referring to FIG. 5, the lower end of the threaded rod 15 is engaged by upper and lower nuts 17 while the stud bolt 16 of FIG. 6 is engaged by a similar nut 18.

As shown more clearly in FIGS. 2 and 3, each of the individual clamp elements includes a central flat intermediate portion 20 pierced by a central aperture 21 which, it will be noted, is larger than the diameter of the tie rods so that these elements may be loosely mounted thereon. It will be noted from FIG. 2 that the central aperture 21 of the intermediate plane surface of the individual clamp members appears elliptical. This circumstance results from the fact that these individual members may be conveniently formed from flat stock which is first drilled and thereafter formed in the manner to be discussed, and in such forming the material is drawn longitudinally to form the circular drill hole as somewhat elliptical as shown. This configuration may thus be considered as an accident of manufacture and forms no part of the present invention. It is important, however, to note that the minimum cross section of the aperture 21 is greater than the diameter of the tie members.

On either side of the central intermediate plane 20 of the individual clamp elements, there is formed a transversely extending recess indicated by the numerals 22 and 23. Adjacent the right hand recess 22 the material of the clamp element extends outwardly as at 24 in the plane of the central intermediate portion to provide a horizontal area. This horizontal area 24 terminates in a downwardly turned lip 25. At the opposite side of the clamp element, the depression 23 is formed with a terminal rounded shoulder 26 extending into an elongated vertical flange 27 of substantially greater depth than the opposing parallel lip 25.

In FIGS. 5 and 6, the individual elements shown in FIGS. 2 and 3 are arranged on the tie rods in successively inverted position such that the lower edge 28 of the wide flange 27 of each adjacent clamp element is received on the under side of the horizontal area 24 within its lip 25. In this cooperative relation of adjacent elements it will be noted that the upwardly facing recesses 22 and 23 of one register with the downwardly facing equivalent recesses of the next adjacent clamp element to provide therebetween substantially circular pockets for reception of articles. As indicated in FIGS. 1 and 5, elements of differing sizes may be used in stacked relation to secure both large tubes and those of smaller diameter. The invention is of course not particularly concerned with the type of tubes, pipes, wires, cables or the like which are to be supported and retained, but as an indication of the universal application of the invention large rubber or platstic tubes are indicated as retained in the structure at 30. Coated metallic tubes may also be retained as indicated at 31, and tubes of smaller diameter are indicated at 32.

In the assembly of these clamp elements there is provided at each end of any group of such elements a plate 33 which is transversely dish shaped providing downwardly curved sides 34 which are adapted to engage the outer sides of the end tubes retained by the intermediate clamp elements. The plates 33 are provided with central apertures 35 of larger diameter than the supporting tie rods so as to freely surround such rods. As shown in FIG. 5, a bottom plate 36 may be provided to support the upwardly turned plate 33 of the bottom of the stacked elements, and similarly at 37 an inverted plate is provided for bridging between the smaller elements of the upper group and the larger elements of the lower group. The upper group of smaller tubes is retained between the lower and upper plates 38 of a size equal to that of plate 37 and similar in contour as the plates 33.

The assembled elements as well as the retaining end plates are compressed by the tie rods which are under tension. In FIG. 5, the upper nut 39 on the tie rod 15 applies compression between the upper small plate 38 and the lower plates 33 and 36, while in FIG. 6 the head of the stud bolt 16 applies compression on the upper plate and the lower plate 33. An important factor in the efficiency and rigidity of the stacked elements is the fact that the tension applied between the upper and lower plates is directed through the tubes retained within the circular end flanges 34 thereof and the next adjacent clamp element. Since the wide side flanges of each adjacent clamp element bear against the horizontal area 24 of the next adjacent element, it will be seen that the thrusts directed by the plates to the tubes are directed by each pair of elements as parallel vertical stresses. Therefore there is no canting of the elements which are freely mounted over the tie members. In this manner the elements act as simple beams which interengage outwardly of the tubes to provide an anchoring force which supports the interengaged assemblies.

The stress relation of these interrelated clamp elements is more clearly indicated in FIG. 4. It will be noted that the nut 40 is applying a downward pressure on the plate 41 as indicated by the thrust arrows 42. This thrust is met by a resistance of the tubes which are not shown but the upward force resisting the compression of the nut is indicated by the upwardly pointing arrows 43 whose resultant is the upwardly pointing vertical arrows 44. The pressure on the tubes also provides downwardly directed thrusts indicated by the arrows 45 which is borne by the next subjacent element 46 and this downward thrust is directed through the wide flange 47 to the surface 48 of the next adjacent element 49 and is equally directed by the narrow surface 50 to the upper wide flange 51 of the element 49. Thus it will be seen as indicated by the arrows 52 that parallel thrusts are directed through the successive engaging elements outwardly from the tubes and independently of engagement of such elements with the tie bars. These elements therefore act as simple beams and since the thrusts are equal and opposite it will be seen that there is no tendency to cant the elements since pressure applied by the nuts to the tie bars will act through the wide flanges of the interengaged elements and through the tubes. This relation of forces and the transmission thereof through the tubes and the interrelated elements provides a new and unusually rigid structure free from any of the disadvantageous features of the more conventional clamp which acts in cantilever fashion to apply pressure to the tubes from a central tie rod rather than applying pressure equally on the opposite sides of the clamps whereby they act, as in the present case, with a beam stress.

By reference to FIGS. 7 and 8 it will be noted that various alternate means may be employed for rigidly securing the tie rods to their supporting elements, as for example a bolt or screw of conventional form with a tapped head or other socket to receive the tie rod. In FIG. 7 the tie rod 60 is threaded into a central bore of a receiving stud 61 which passes through the flange 14 to be secured by a nut 62. Where the tie rod 60 is to be secured from a blind hole, the arrangement may be as in FIG. 8 where the tie rod is threaded into the stud 61 but where the stud is directly threaded into the blind hole 63 of the support 64.

In that alternative form of the invention presented by FIGS. 9, 10 and 11 any desired grouping of pairs of identical elements 70 and 71 may be employed to form racks in the manner of FIGS. 9 and 10. Each element, 70 and 71, includes a central longitudinally extending body 72 with transverse recesses 73 on each side of a central bolt bore 74. Along one longitudinal edge of each element body 72 there is formed a narrow lip 75 formed in a plane normal to the general plane of the body. At each opposite longitudinal edge there is formed a wide flange 76 also normal to the plane of the body and hence parallel to the lip 75. As more clearly seen in FIG. 10, as assembled, the lips 75 and flanges 76 of engaging pairs of elements lie in parallel abutting contact. As distinct from the interrelation of the elements of FIGS. 1 through 6 this interengagement is longitudinal rather than transverse. Thus the whole length of the central supporting body surface is sustained and supported, the edge of each flange contacting the full length of the under surface of the central body of its companion element. As will be noted at numeral 77 appropriate indentations are formed along the terminal edges of the flanges 76 to accommodate the article receiving recesses 73 of the central body.

As in FIGS. 1, 5 and 6 the elements 70 and 71 may be arranged in any desired groups of like or varying size and may be secured by bolts 78 to a suitable support indicated at 79. In this form of the invention, instead of the plates 33, 36, 37 or 38 of FIGS. 5 and 6, terminal pieces 80 and 81 of identical form may be employed. Such pieces are similar to the elements 70 and 71 in that they are formed with opposed longitudinal lips and flanges 82 and 83 respectively. Also similarly they are formed with central bolt apertures 84 and the flange edges are recessed as at 85 to conform with the transverse article receiving recesses 73 of adjoining elements 70 or 71. The body of pieces 80 and 81 are however plane, free from transverse depressions such as those of 73 in the elements 70 and 71. Thus these pieces may form a base or a cap for a multiple assembly of pairs of elements 70 and 71, as in FIGS. 9 and 10. In such case the smooth plane surfaces of their body portions will provide flat contact surfaces for engagement with supports or retaining elements.

In further consideration of that form of the invention shown in FIGS. 9 to 11 it may be noted that the free edges of the lips 75 are illustrated as following the curve of the depressions of the body 72. Such curvature may result from the economical and preferred mode of manufacture by a stamping operation in which the transverse depressions are formed after or as an incident to the turning down of the lip 82. Since the edges of the lips 82 are not shown as abutting the opposed inner body surface, such edges may be straight in the manner of the lip edges of the pieces 80 and 81. In considering this form of the invention, reference may also be had to the schematic representations of forces presented in FIG. 4 and discussed above. If, for the purposes of the elements 70 and 71, FIG. 4 is considered as having longitudinal lips and flanges it will be noted that the forces will act in the same manner and the same beam type reactances will have the same beneficial results.

Referring now to that form of the invention shown in FIGS. 12 through 14, the clamping elements 90 here depicted each include a central longitudinally extending body 91 with transverse upper and lower recesses being formed on each side of a central bore 92. The lower recesses are formed by upwardly extending outer protuberances 93, arranged adjacent the corners of body 91 and also upwardly extending inner protuberances 94 arranged adjacent central bore 92. The inner portion of the upper recesses are formed by downwardly extending inner protuberances 95 which are aligned transversely with protuberances 94 as seen in FIG. 14. The outer portion of the upper recesses are formed by the downwardly curved outer ends 96 of body 91.

Centrally of body 91, a pair of spaced depending flanges 97 are provided which project below the plane of the lowermost portion of ends 96. The vertical edges of flanges 97 are provided with inwardly turned lips 98, the lower ends of which engage the upper surface of the next lower clamping element 90. Flanges 97 project from the sides of body 91 and are aligned transversely with bore 92. Generally, flanges 97 are arranged in vertical planes parallel to each other and hence lie normal to the plane of body 91. In some instances however, it may be found desirable to incline the flanges 97 inwardly so that they converge slightly whereby the bottom edges of lips 98 engage more centrally on the surface of the next lower clamping element 90.

As in the previous embodiments, the stacked clamping elements 90, shown in FIG. 12, receive through their bores, such as bore 92, a bolt 99 which secures these elements in aligned fashion to a suitable bracket 100. The upper and lower recesses thereby clamp and retain suitable tubes or conduits 101.

It will be seen that when bolt 99 is tightened, the lips 98 will be urged against the upper surface of the next lower clamping element 90 and hence limit the amount of squeeze which may be applied by elements 90 to the conduits. It will be understood, however, that, as in the previous embodiments, the forces will be distributed evenly to the various elements 90.

If it is desired to limit the amount of squeeze applied by the previously described embodiments, a suitable spacer sleeve 102, surrounding bolt 79, as shown in FIG. 15, may be employed between each of the assembled clamping elements, such as between the complementary elements 70 and 71.

Referring now to FIGS. 16 and 17, it will be seen that if the elements are to retain conduits 110 which bend after passing through the assembly, the recesses 111 of these further modified clamping elements 112 may be belled adjacent their entrances and exits as shown in FIG. 17. Thus the recesses have a shape similar to a section of a hyperboloid.

From the foregoing it will be seen that the present invention provides a novel and improved clamp of simple construction well designed to meet the demands of economic manufacture and so constructed and arranged as to effectively engage the tubes to retain them against accidental displacement. It will be seen that the individual elements may be made in quantities and that each element is exactly like its next adjacent element. The structure not only insures a rigid assembly of various multiples of these elements but it insures retention of the tubes by forces acting outwardly of the tubes and in vertical stress relation. It will of course be understood that the invention is not limited or confined to the specific designs of the elements here shown nor to any of the various assemblies of such elements here portrayed. In the practice of the invention numerous changes, modifications and the full use of equivalents may be resorted to without departure from the spirit or scope thereof as defined in the appended claims.

I claim:

1. A clamp element including a central portion defining a rod receiving aperture, article engaging portions on opposite sides of said aperture, and means adjacent said article engaging portions for delivering equal parallel forces in planes normal to the plane of the central element portion, the means on one side of the clamp element being adapted to deliver its force at a point more remote from the central portion than the force delivered by the other means.

2. A clamp element for clamping tubular members including a central portion defining a rod receiving aperture, article engaging portions on opposite sides of said aperture, and means adjacent said article engaging portions for delivering equal parallel forces in planes normal to the plane of the central portion, the means on one side of the clamp element being adapted to deliver its force at a point more remote from the central portion than the force delivered by the other means and comprising a flange extending in a plane normal to the central portion.

3. A clamp element for clamping tubular members including a central portion defining a rod receiving aperture, article engaging portions on opposite sides of said aperture, and means adjacent said article engaging portions for delivering equal parallel forces in planes normal to the plane of the central portion, the means on one side of the clamp element being adapted to deliver its force at a point more remote from the central portion than the force delivered by the other means and comprising a flange extending in a plane normal to the central portion while the opposite means comprises a surface parallel with the upper surface of the central portion.

4. A clamp assembly including at least two opposed elements each including spaced article engaging portions and means disposed outwardly beyond each portion receiving spaced parallel forces urging said elements together, said elements being substantially identical and being loosely mounted on a central tie rod in back-to-back relationship.

5. A clamp assembly including at least two opposed elements each including spaced article engaging portions and means disposed outwardly beyond each portion receiving spaced parallel forces urging said elements together, said elements being substantially identical and being loosely mounted on a central tie rod in back-to-back relationship, the means beyond one article engaging surface being a flange right angularly disposed while the opposite means includes an area normal to the plane of said flange.

6. A multiple article supporting or retaining rack including end plates, inverted pairs of interengaging clamp elements disposed between said end plates, a tie rod passing through all of said plates and elements, and means on said rod for pressing said end plates toward each other, said interengaging clamp elements including spaced parallel means for delivering equal stresses therebetween in parallel directions, one of said means including a flange extending in a plane normal to the plane of the element, the other including a lip parallel to the plane of the flange.

7. A multiple article supporting or retaining rack including end plates, inverted pairs of interengaging clamp elements disposed between said end plates, a tie rod passing through all of said plates and elements, and means on said rod for stressing said end plates toward each other, said interengaging clamp elements including means for delivering equal stresses therebetween in parallel directions, one of said means including a flange extending in a plane normal to the plane of the element, the other including a lip parallel to the plane of the flange, the elements of each pair being inverted with respect to each other.

8. A multiple article supporting or retaining rack including end plates, inverted pairs of interengaging clamp elements disposed between said end plates, a tie rod passing through all of said plates and elements, and means on said rod for stressing said end plates toward each other, said interengaging clamp elements including means for delivering equal stresses therebetween in parallel directions, one of said means including a flange extending in a plane normal to the plane of the element, the other including a lip parallel to the plane of the flange, the elements of each pair being inverted with respect to each other and being loosely mounted on the tie rod.

9. A clamp assembly including parallel pairs of clamp elements having interengaging means at their outer ends for delivering parallel equal forces in planes normal thereto, and tensioning means for applying equal forces to spaced areas of said clamp elements whereby each element will act as simple beam force transmitting member, the interengaging means of one end being a flange extending in the direction of force delivery while the other is a surface having at least a portion thereof normal to the direction of force delivery.

10. A clamp assembly including parallel pairs of clamp elements having longitudinally extending interengaging means for delivering parallel equal forces in planes normal thereto, and tensioning means for applying equal forces to spaced areas of said clamp elements whereby each element will act as simple beam force transmitting member, the interengaging means of one end being a flange extending in the direction of force delivery while the other is a lip adapted to receive the outer edge of a companion flange, the elements of each pair being arranged in back-to-back relationship to each other.

11. A clamp element including a central portion defining a rod receiving aperture and presenting substantially flat article receiving engaging portions on opposite sides of said aperture, and protuberances adjacent said article receiving engaging portions for restricting the movement of the articles engaged by the portions.

12. The structure defined in claim 11 wherein said clamping element includes upper and lower portions and said protuberances project from both said upper and lower surfaces.

13. A clamp element comprising a body having upper and lower portions, there being provided a central bore through said body and downwardly curved ends, protuberances adjacent the corners of said body inwardly of said ends, and other protuberances adjacent said bore, said protuberances defining therebetween conduit receiving portions.

References Cited in the file of this patent

UNITED STATES PATENTS

| | | |
|---|---|---|
| 1,852,363 | Parent | Apr. 5, 1932 |
| 2,912,206 | Ferris | Nov. 10, 1959 |

FOREIGN PATENTS

| | | |
|---|---|---|
| 163,097 | Austria | May 10, 1949 |
| 527,634 | Great Britain | Oct. 14, 1940 |
| 544,618 | Great Britain | Apr. 21, 1942 |